United States Patent [19]

Yamaguchi

[11] Patent Number: 5,802,303
[45] Date of Patent: Sep. 1, 1998

[54] MONITOR DATA COLLECTING METHOD FOR PARALLEL COMPUTER SYSTEM

[75] Inventor: Rie Yamaguchi, Yokohama, Japan

[73] Assignee: Hitachi, Ltd., Tokyo, Japan

[21] Appl. No.: 510,073

[22] Filed: Aug. 1, 1995

[30] Foreign Application Priority Data

Aug. 3, 1994 [JP] Japan .................................. 6-182156

[51] Int. Cl.⁶ .............................................. G06F 15/16
[52] U.S. Cl. .............................. 395/200.54; 395/200.3; 395/200.31
[58] Field of Search .................... 395/200.11, 800, 395/800.28, 200.31, 200.54, 200.3

[56] References Cited

U.S. PATENT DOCUMENTS

| | | | |
|---|---|---|---|
| 4,419,762 | 12/1983 | Paul | 377/66 |
| 4,590,550 | 5/1986 | Eilert et al. | 364/554 |
| 4,959,772 | 9/1990 | Smith et al. | 395/185.01 |
| 5,325,530 | 6/1994 | Mohrmann | 395/700 |
| 5,471,617 | 11/1995 | Farrand et al. | 395/700 |
| 5,530,871 | 6/1996 | Abe | 395/732 |
| 5,548,785 | 8/1996 | Fogg, Jr. et al. | 395/841 |
| 5,559,958 | 9/1996 | Farrand et al. | 395/183.03 |

FOREIGN PATENT DOCUMENTS

A-4-69765  3/1992  Japan .

OTHER PUBLICATIONS

L. Steinberg, "Techniques for Managing Asynchronously Generated Alerts", IBM Corporation, RFC1224, May 1991, pp. 1–22.

S. Waldbusser, "Token Ring Extension to the Remote Network Monitoring MIB," Carnegie Mellon University, RFC1513, Sep. 93, pp. 1–55.

S. Waldbusser, "Remote Network Monitoring Management Information Base", Carnegie Mellon University, RFC 1271, Nov. 1991, pp. 1–81.

*Primary Examiner*—Mehmet B. Geckil
*Attorney, Agent, or Firm*—Antonelli, Terry, Stout & Kraus, LLP

[57] ABSTRACT

In a parallel computer system including a plurality of nodes, monitor data acquired by each node is collected in one of the nodes to present the collected monitor data in a realtime manner. Even when the number of data acquiring nodes is increased and/or even when the interval time of acquiring monitor data is decreased, the data collecting node conduct operations in an asynchronous manner with respect to the data acquiring nodes. This minimizes the load imposed on the data collecting node. Monitor data acquired by a program at a predetermined interval of time in each data acquiring node is sent via a network to a control node, which then displays the monitor data on a console in a realtime fashion. The control node includes a memory in which a reception area is reserved for each node. The acquired data is directly written in the associated reception area without causing an event of interruption. Consequently, even when the number of nodes is increased and/or even when the data acquiring interval of time is reduced and hence the data transmission interval of time is decreased, the load on the data collecting node is kept at an appropriate level. Moreover, since the processing is not interrupted as above, the data can be collected and displayed in an asynchronous way with respect to the acquisition of monitor data. Namely, information of monitor data can be presented in a realtime fashion by adjusting the data collecting interval.

7 Claims, 8 Drawing Sheets

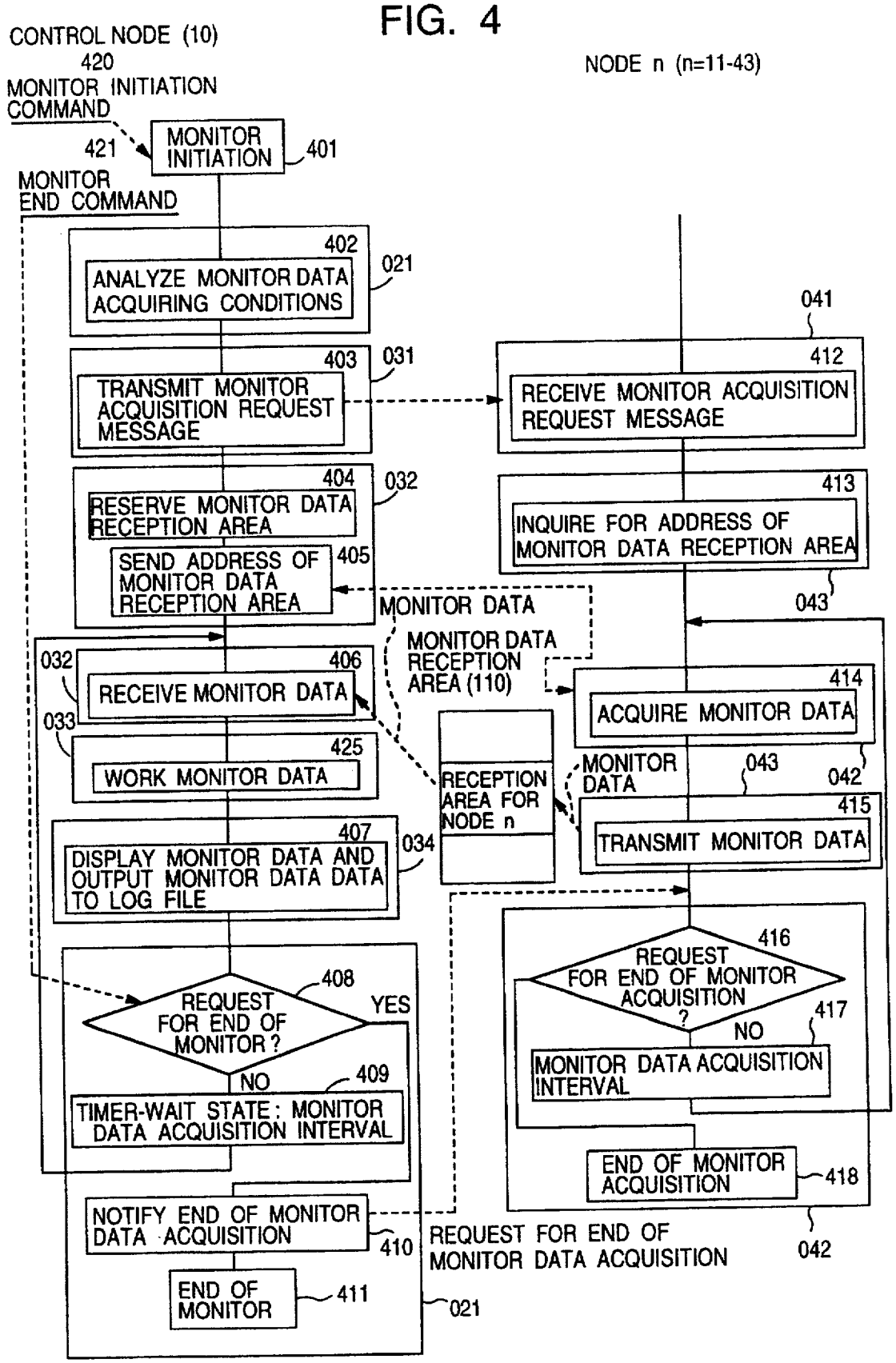

FIG. 5

MIONITOR ACQUISITION REQUEST MESSAGE (500)

| F | MONITOR ACQUISITION DATA TYPE | MONITOR DATA ACQUISITION INTERVAL |
|---|---|---|

F: MONITOR ACQUISITION REQUEST MESSAGE IDENTIFIER
MONITOR ACQUISITION DATA TYPE : SPECIFY MONITOR DATA ITEMS SUCH AS CPU UTILIZATION RATIO, MEMORY UTILIZATION AMOUNT, NO. OF I/O OPERATIONS, AND NETWORK COMMUNICATION AMOUNT IN SEQUENCE

MONITOR DATA ACQUISITION INTERVAL : SPECIFY INTERVAL OF TIME FOR MONITOR DATA ACQUISITION

MONITOR DATA COLLECTING METHOD FOR PARALLEL COMPUTER SYSTEM

BACKGROUND OF THE INVENTION

The present invention relates to a method of collecting monitor data in a parallel computer system in which a plurality of processors are linked with each other via a high-speed network and which includes a control node for controlling operation states of the respective processors.

In a conventional method of gathering monitor data, a collecting node issues an enquiry to monitor acquiring nodes such that an event of interruption takes place in the collecting node each time data is received from any one of the acquiring nodes, thereby amassing the monitor data in the collecting node.

According to the method, the interruption occurs for each data received from the acquiring node. Moreover, when the interval between the monitor data acquiring operations is decreased, the overhead imposed on a central processing unit (CPU) of the collecting or gathering node is increased, which hence exerts an adverse influence over other processes. In addition, when the load on the monitor data gathering node becomes greater, the data receiving operation cannot be terminated during a predetermined period of time and hence there occurs an event of overflow of the monitor data in the gathering node. On this occasion, the data presented on a display device of the data gathering node is an old data item other than the current data. Namely, the system is unable to conduct a realtime display operation of the monitor data.

A technology of this type has been described, for example, in the JP-A-4-69765.

As described above, since the CPU overhead is increased due to the enquiries from the collecting node to the acquiring nodes and the occurrences of interruption in the acquiring nodes, it is difficult to collect monitor information in a realtime fashion.

SUMMARY OF THE INVENTION

It is therefore an object of the present invention to provide a monitor data gathering method for a parallel computer system in which even when the data acquiring nodes are increased in number and/or even when the interval between the data acquiring operations is minimized in the data acquiring nodes, the load on the collecting node is kept at an appropriate level so that available latest monitor data is presented on the display and is stored in a log file.

According to the present invention, there is provided a monitor data collecting method for use in a parallel computer system of a distributed memory type including a plurality of data acquiring nodes coupled with each other via a high-speed network, each of the data acquiring nodes not including a console device; a data collecting node for gathering monitor information, and a console device (display) connected to the collecting node for displaying the monitor information thereon. The system further includes as communicating means a method of directly writing data in a memory of a transmission destination in an asynchronous fashion. In each data acquiring node, monitor information is acquired or gathered to be transmitted to the data collecting node at a specified constant interval of time. The monitor information is written in a data reception area of a storage of the collecting node without causing an event of interruption, the area being allocated to the pertinent node. Thereafter, the collecting node references the data reception areas respectively allocated to the data acquiring nodes at a specified interval of time to obtain desired data.

In the monitor data gathering method of a parallel computer system according to the present invention, the data acquiring nodes take precedence in the data collecting operation. Namely, monitor data acquired by the acquiring node is directly written in the data reception area of the memory of the collecting node. The data reception areas are thereafter referenced by the collecting node to attain monitor information in a quasi-realtime mode. Furthermore, even when the number of data acquiring nodes is increased and/or the interval time of acquiring data is reduced in the acquiring nodes, the interval of time to reference the acquired data can be appropriately set according to the processing capability of the collecting node.

BRIEF DESCRIPTION OF THE DRAWINGS

These and other objects and advantages of the present invention will become apparent by reference to the following description and accompanying drawings wherein:

FIG. 4 is a flowchart showing an example of the control operation achieved by an operating system to collect monitor data in the parallel computer system;

FIG. 5 is a diagram showing the format of a monitor acquisition request message used in the parallel computer system;

DESCRIPTION OF THE PREFERRED EMBODIMENTS

Referring now to the accompanying drawings, description will now be given in detail of an embodiment according to the present invention. It is to be appreciated that the present invention is not restricted by the embodiment.

Figure 1:
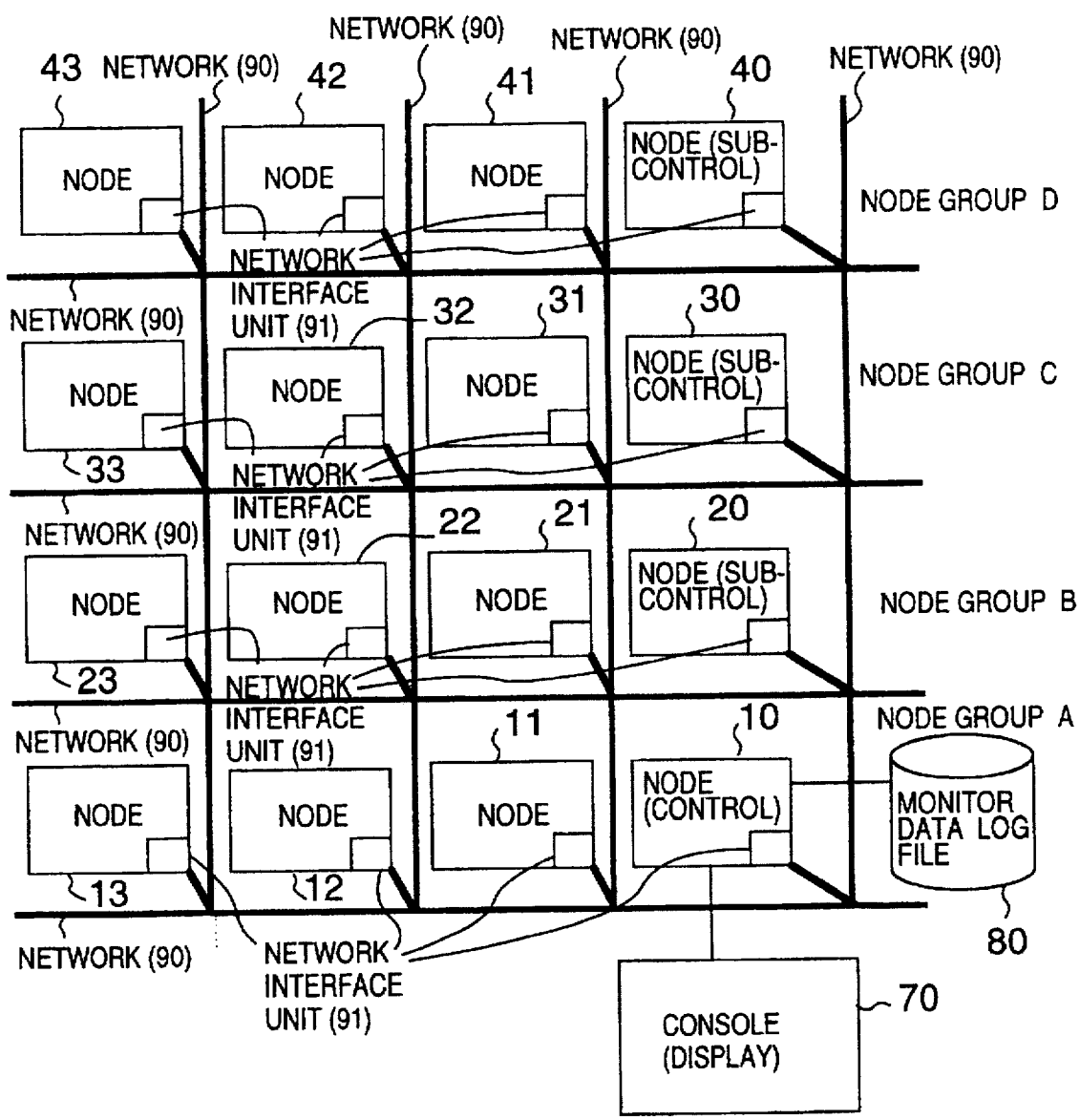
FIG. 1 is a diagram schematically showing the hardware configuration of a parallel computer system to which the present invention is applied.

As can be seen from FIG. 1, the hardware 10 construction of a parallel computer system 1000 of the embodiment includes 16 nodes 10 to 13, 20 to 23, 30 to 33, and 40 to 43 each including a processor and a memory, a network 90 and network interfaces 91 for coupling the nodes to each other, a disk device 80 for containing therein a monitor data log file, and a console device 70 for handling and monitoring operations of the system.

Next, the fundamental idea of the embodiment will be described by referring to FIG. 1.

In operation of gathering monitor data, monitor data obtained by a monitor data acquiring program 04 (FIG. 2) of each of the nodes 10 to 13, 20 to 23, 30 to 33, and 40 to 43 is sent via the network 90 to the control node 10, which then displays the received data on the console device 70 in a realtime fashion.

Figure 2:
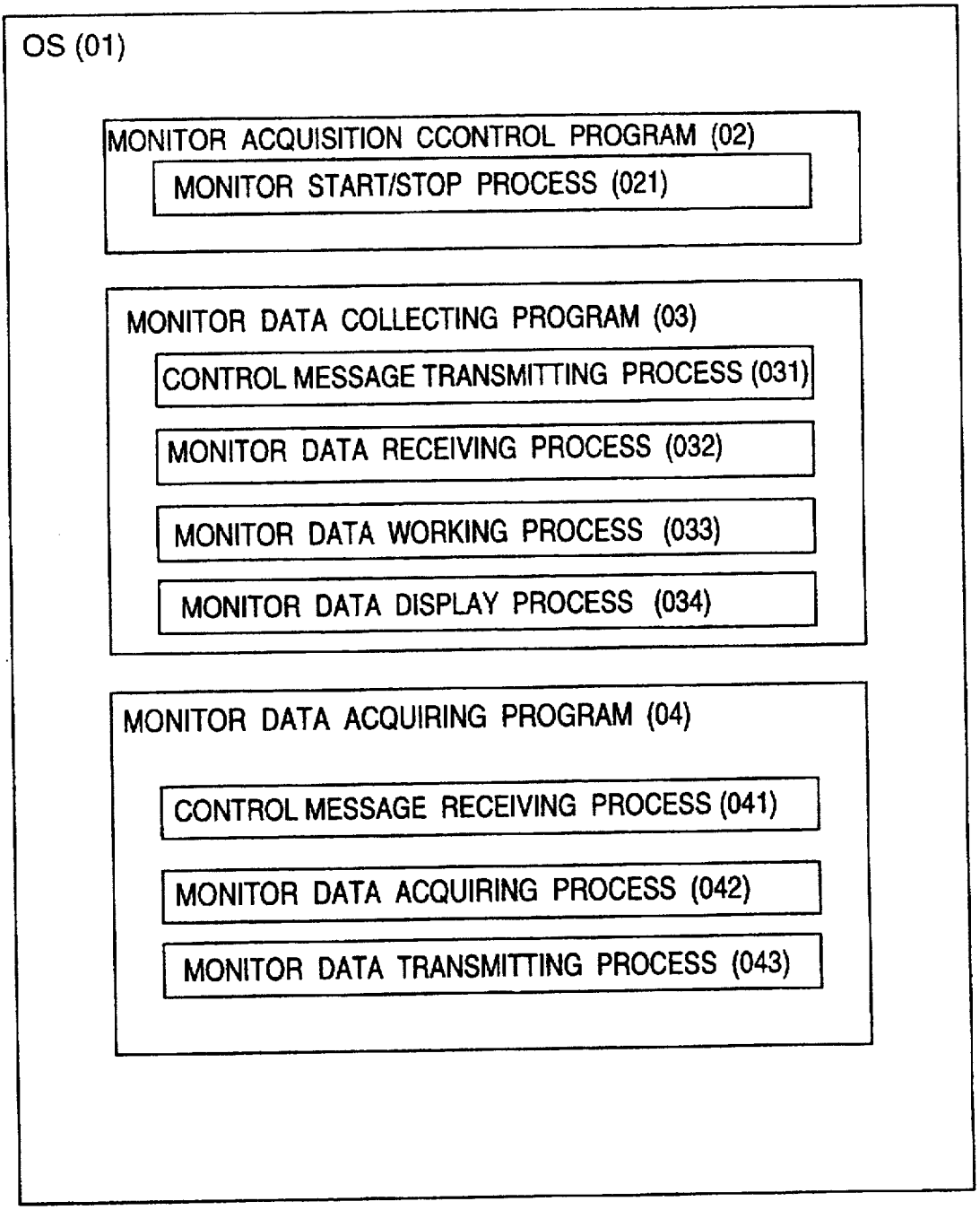
FIG. 2 is a diagram showing the software constitution for gathering monitor information in the parallel computer system of FIG. 1.

As shown in FIG. 2, the software constitution includes an operating system 01 including a monitor acquisition control program 02, a monitor data collecting program 03, and a monitor data acquiring program 04.

The monitor acquisition control program 02 includes a monitor start/stop process 021.

The monitor data collecting program 03 includes a control message transmitting process 031, a monitor data receiving process 032, a monitor data working process 033, and a monitor data display process 34.

The monitor data acquiring program 04 includes control message receiving process 041, a monitor data acquiring process 042, and a monitor data transmitting process 043.

In this connection, the monitor acquisition control program 02 and monitor data collecting program 03 exist only in the control node 10, whereas the monitor data acquiring program 04 is loaded in each node.

Figure 3:
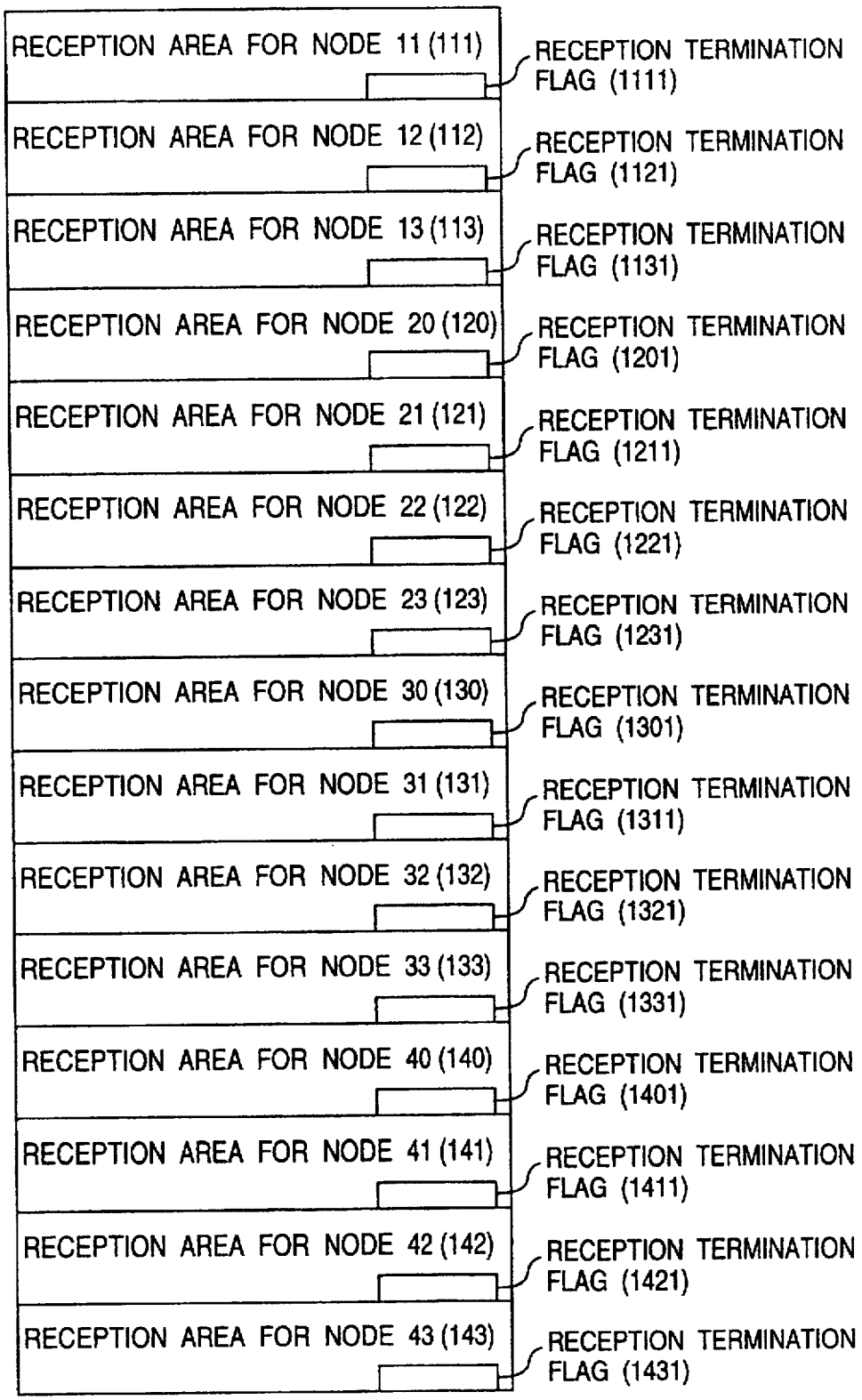
FIG. 3 is a diagram showing monitor data reception areas of respective control nodes of the parallel computer system.

FIG. 3 shows a layout example of the monitor data reception area.

To receive monitor data, the memory of the control node 10 includes monitor data receiving areas 110 including data receiving areas 111 to 113, 120 to 123, 130 to 133, and 140 to 144 respectively assigned to the nodes 11 to 13, 20 to 23, 30 to 33, and 40 to 44. The respective data reception areas include reception termination flags 1111, 1121, and 1131; 1201, 1211, 1221, and 1231; 1301, 1311, 1321, and 1331; and 1401, 1411, 1421, and 1431.

Subsequently, FIG. 4 shows an example of the control flowchart of the operating system 01 in the monitor data acquiring operation. Moreover, FIG. 5 shows the format of a monitor acquisition request message. In the message, there are specified a data acquisition request message identifier, a monitor data acquisition data type, and a monitor data acquiring interval.

Acquisition of monitor data is commenced when the monitor acquisition control program 02 is started in the control node 10 (step 401). The program 02 is initiated when a monitor start command 420 is inputted to the system.

The monitor acquisition start/end process 021 included in the monitor acquisition control program 02 analyzes parameters indicated by arguments of the monitor start command 420 to decide a group of nodes for the monitor data acquisition, a type of monitor data, and a monitor data acquiring interval (step 402).

Available monitor data types include, for example, a CPU utilization ratio, a memory usage amount, the number of paging operations, the number of network transfers, a network communication amount, the number of disk input/output operations, and an amount of disk input/output data.

The monitor start/end process 021 produces a monitor acquisition request message 500 including a monitor data type and a monitor data acquiring interval and then passes the message 500 to the control message transmitting process 031 of the monitor data collecting program 03.

Furthermore, to initiate collection and display of monitor data, the system starts the monitor data receiving program 032, monitor data working process 033, and monitor data display process 034 included in the monitor data collecting program 03.

The control message transmitting process 031 sends the monitor acquisition request message 500 to the nodes determined as above for the monitor data acquisition (step 403). The message 500 is received by the control message receiving process 041 of the nodes (step 412).

Since node n control message reception process (041) was preliminarily activated at the time of starting the OS of node n, it is awaiting reception of the monitor acquisition request message (500).

The monitor data transmitting process 043 inquires of the monitor data receiving process 032 an address of the monitor data reception area (step 413).

The control message reception process 041 invokes the monitor data acquiring process 042 and monitor data transmitting process 043 according to the contents of the monitor acquisition request message 500 to commence acquisition of monitor data (step 414).

The monitor data receiving process 032 then reserves the monitor data reception area 110 shown in FIG. 3 (step 404). In the area 110, a physical memory area is fixedly allocated to a virtual address space and hence the physical address thereof is kept unchanged during the monitor data acquisition.

In response to the enquiry, the monitor data receiving process 032 supplies the monitor data transmitting process 043 of each monitor data acquiring node with a physical address of the monitor data reception area reserved for the pertinent node (step 405).

The monitor data acquiring process 042 obtains monitor data specified by the message 500 at the monitor data acquiring interval contained in the message 500 (step 414) and then passes the monitor data to the monitor data transmitting process 043.

The process 043 specifies the physical address of the monitor data reception area prepared for the pertinent node and notified from the monitor data receiving process 032 and then transmits the monitor data obtained by the acquiring process 042 to the communicating partner via the network interface 91 and network 90 (step 415).

On receiving data via the network 90 from the monitor acquiring node, the interface 91 of the control node 10 immediately writes the data directly in the monitor data reception area at the specified physical address and sets the reception termination flag without causing an event of interruption.

In this fashion, even when data is concentrated onto the control node 10, the data can be received without causing the interruption. This possibly minimizes the influence of the control node 10 adversely exerted on the CPU. Consequently, in a parallel computer system including a large number of nodes, monitor information of each node can be gathered in a realtime manner.

The monitor data acquiring process 042 sets the timer according to the monitor acquisition interval of time specified at initiation of the monitor and then enters the wait state (417). When the specified period equivalent to the monitor acquisition interval of time lapses, the process 042 repeatedly executes steps 414 to 417.

The monitor data is periodically transmitted at the monitor acquisition interval designated when the monitor is activated. Even when the pertinent monitor data is not completely processed by the monitor data receiving process 032, the network interface 91 of the control node 10 is able to write the next monitor data in the memory in an overlapping manner in which the current data overlaps with the previous data in the storage area. Consequently, the processing is not adversely influenced by the delay in the process of the monitor data collecting program 03.

The monitor data display process 034 references the monitor data in the monitor data reception area 110 at the monitor collecting interval of time specified at initiation of the monitor. At this point of time, the monitor data in the reception area 110 allocated to the pertinent node is displayed on the console 70 in the realtime fashion. Moreover, the display process 034 writes the monitor data in the monitor data log file 80 (step 407).

Using the monitor data stored in the log file 80, it is possible to reproduce on the console monitor data in an arbitrary range of time.

Figure 7:
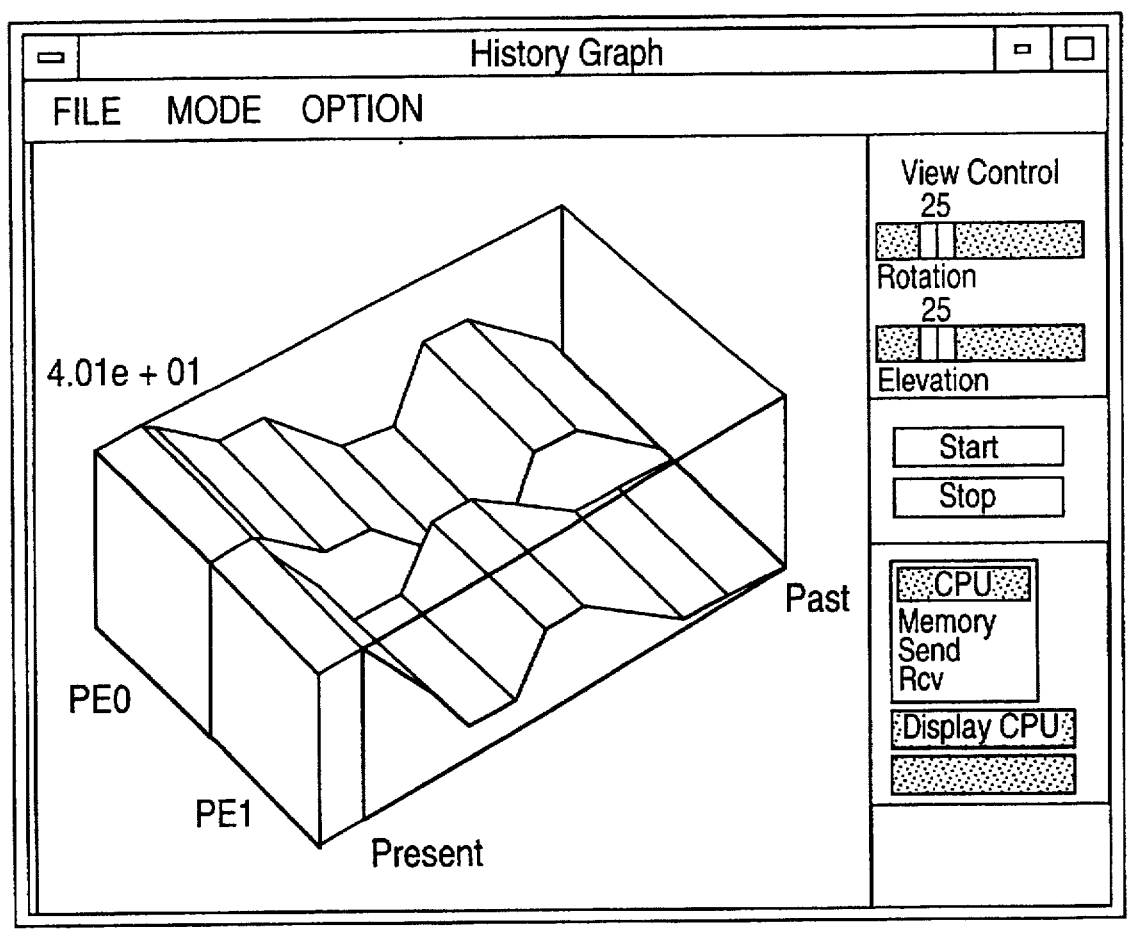
FIG. 7 is a diagram showing an example of monitor data presented on a display of the parallel computer system.

FIG. 7 shows an example of the monitor data presented on the console.

In the image of FIG. 7, a line drawn from "present" to "past" indicates lapse of time. PE0 and PE1 denotes that information items related thereto are associated with nodes 0 and 1, respectively. PEn is additionally provided as the number of monitor data acquisition nodes is increased. The ordinate stands for the CPU usage ratio of each node. This example shows the change in the CPU usage ratio of each node with respect to time.

As above, the monitor data acquiring process and monitor collecting process are conducted independently of each other. Thanks to this provision, it is possible to remove, for example, the problem in which the overall monitor data acquiring process is delayed due to a temporary retardation in the monitor collecting process.

When a monitor end or termination command 421 is inputted to the system, the monitor start/end process 021 terminates operation of the monitor. The process 021 notifies the end of monitor collection to the monitor data display process 034 and monitor data acquiring process 042 (step 410) and then terminates the operation (step 411).

On receiving the monitor termination message, the monitor data acquiring process 042 terminates the monitor data acquiring process (step 418).

Furthermore, returning to the system configuration diagram of FIG. 1, assume that the groups of nodes are partitioned as follows. Groups of nodes 10 to 13, 20 to 23, 30 to 33, and 40 to 44 are classified as node groups A to D, respectively. Particularly, node 10 and nodes 20, 30, and 40 are specified as a control and sub-control node and sub-control nodes, respectively.

Figure 6A:
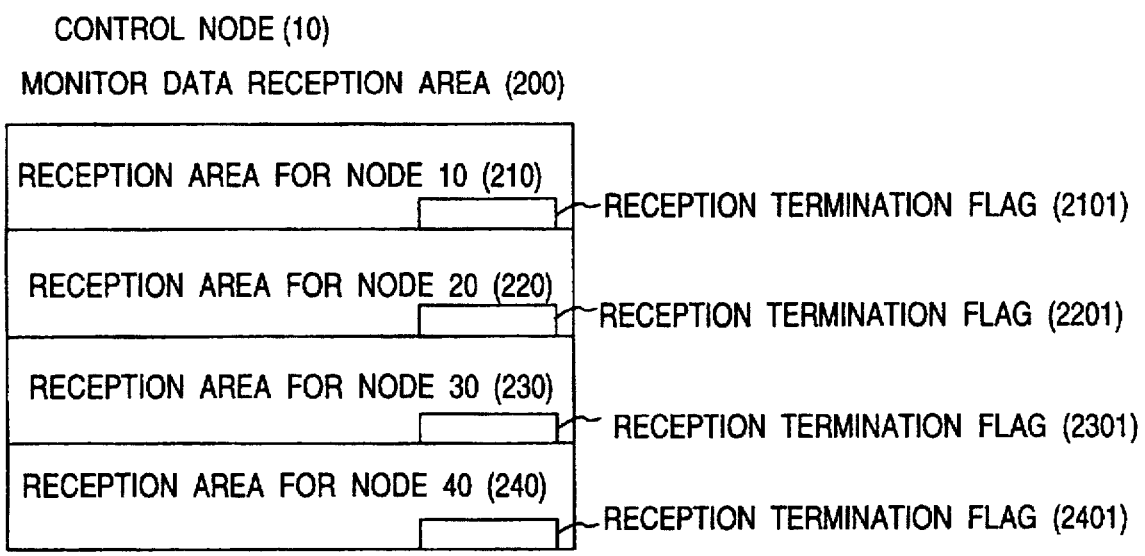
FIGS. 6A and 6B are a diagram showing monitor data reception areas of the control node and sub-control nodes in the parallel computer system.
Figure 6B:
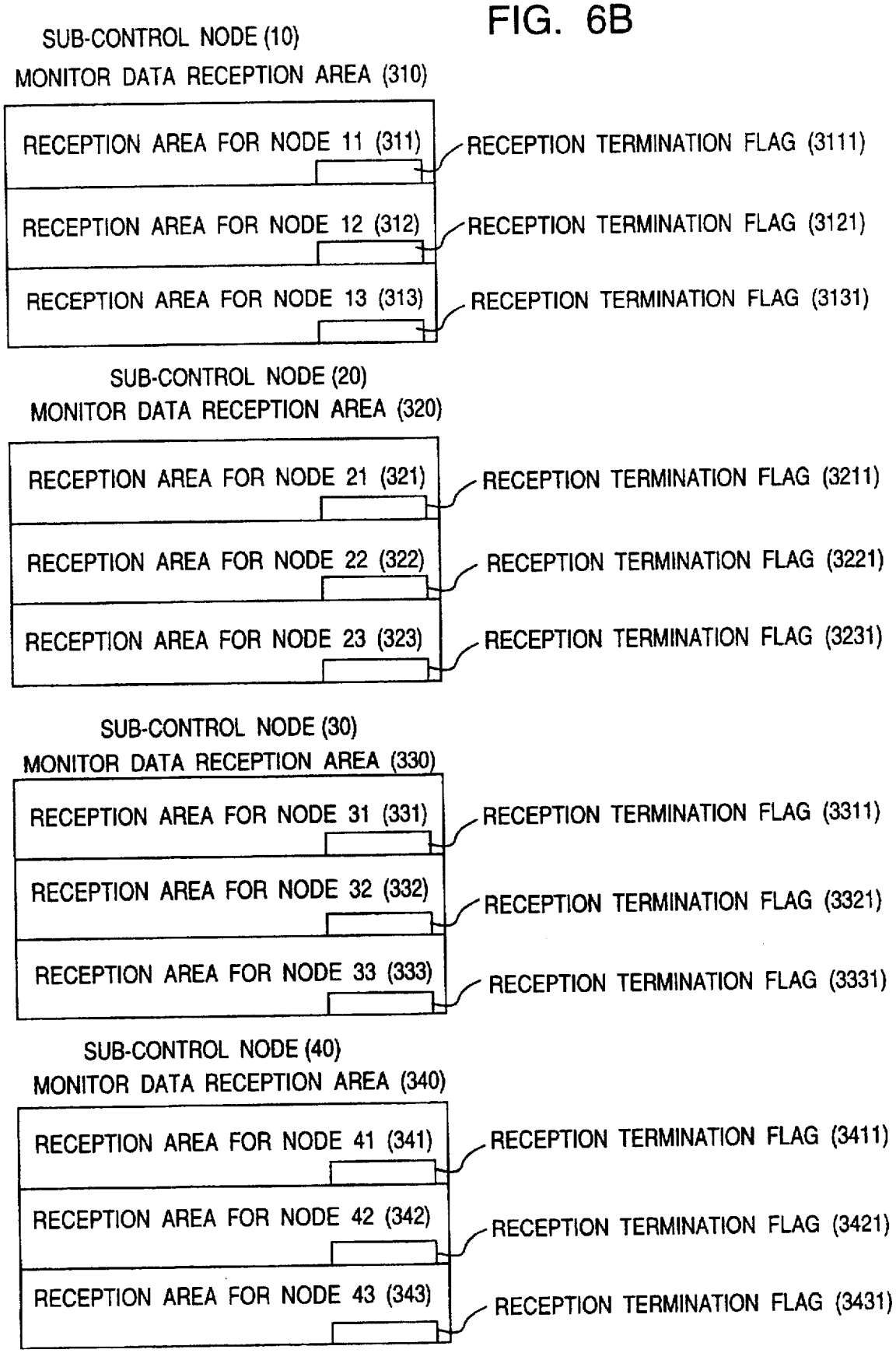

FIGS. 6A and 6B show the configuration of the monitor data reception area 200 of the control node 10 and monitor data reception areas 310, 320, 330, and 340 respectively of the control and sub-control nodes 10, 20, 30, and 40.

In the memories respectively of the sub-control nodes 10, 20, 30, and 40 to receive monitor data from nodes respectively belonging to node groups A to D, there are disposed the monitor data reception areas 310, 320, 330, and 340. These areas include reception areas 311 to 313, 321 to 323, 331 to 333, and 341 to 343 for the respective nodes. On the other hand, in the memory of the control node 10 to receive monitor data from the sub-control nodes 10, 20, 30, and 40, there are arranged the reception areas 210, 220, 230, and 240 for the sub-control nodes 10, 20, 30, and 40, respectively.

Acquisition of monitor data is commenced when the monitor acquisition control program 02 is initiated in the control node 10. For the monitor data acquisition, the monitor types and monitor acquisition interval of time are determined by the user interface for monitor acquisition. The control message transmitting process 031 sends a monitor acquisition request message containing the monitor type and acquisition interval to the sub-control nodes 10, 20, 30, and 40.

On receiving the monitor acquisition request message 500 from the control message receiving process 041, the nodes 10, 20, 30, and 40 transmit the message 500 to the nodes associated with the node groups A (nodes 11 to 13), B (nodes 21 to 23), C (nodes 31 to 33), and D (nodes 41 to 43), respectively.

In each of the nodes 11 to 13, 21 to 23, 31 to 33, and 41 to 43, the control message receiving process 041 receives the message 500 and then starts the monitor data acquiring operation at the specified acquisition interval of time. The nodes 11 to 13, 21 to 23, 31 to 33, and 41 to 43 send by the monitor data transmitting process 043 the obtained monitor data via the network 90 respectively to the reception areas 311 to 313, 321 to 323, 331 to 333, and 341 to 343 allocated to the respective nodes in the monitor data reception areas 310, 320, 330, and 340 of the sub-control nodes 10, 20, 30, and 40, respectively. As the reception areas 311 to 313, 321 to 323, 331 to 333, and 341 to 343 assigned to the respective nodes, physical memory areas are fixedly allocated to the virtual address space. The transmitting process 043 of each node beforehand obtains the right of transmission to the pertinent reception area and address information of the reception area. Specifying the address, the process 043 transmits the data to the reception area and thereafter sets the associated reception termination flag.

In the respective sub-control nodes 10, 20, 30, and 40, the network interface 91 immediately writes the data received via the network 90 respectively from the related nodes 11 to 13, 21 to 23, 31 to 33, and 41 to 43 respectively in the reception areas 311 to 313, 321 to 323, 331 to 333, and 341 to 343 associated with the respective nodes according to the specified addresses without causing the event of interruption. Thereafter, the interface 91 sets the reception termination flags of the respective nodes.

The sub-control nodes 10, 20, 30, and 40 re-arranges by the monitor data working process 033 the data stored respectively in the reception areas 311 to 313, 321 to 323, 331 to 333, and 341 to 343 associated with the respective nodes to decrease the amount of data and then transmit the resultant data via the network 90 to the control node 10.

In the monitor data reception area 200, physical memory areas are fixedly allocated to the virtual address space. The monitor data transmitting process 043 of each of the sub-control nodes 10, 20, 30, and 40 obtains in advance the right of transmission to the pertinent one of the reception areas 210, 220, 230, and 240 and address information of the reception area. Specifying the address, the process 043 transmits the data to the reception area.

On receiving data via the network from the respective sub-control nodes 10, 20, 30, and 40, the interface 91 of the control node 10 immediately writes the data respectively in the reception areas 210, 220, 230, and 240 according to the specified addresses without causing interruption in the process and thereafter sets the reception termination flags 210, 2201, 2301, and 2401 respectively related to the nodes.

In the control node 10, the monitor data is received by the monitor data receiving process 032 to be then stored in the monitor data receiving area 200. The stored monitor data is referenced by the monitor data displaying process 034 at an arbitrary interval of time. The monitor data detected in the reception areas 210, 220, 230, and 240 during the reference operation are presented on the console 70. Additionally, the monitor data is written in the monitor data log file 80.

According to the present invention, monitor data obtained by each monitor data acquiring node is written directly in the data reception area allocated to the node. Consequently, the monitor data collecting node can display and write in a log file the collected data at an arbitrary interval of time in an asynchronous manner with respect to the acquiring operations of the monitor data acquiring nodes. Even when the number of nodes becomes greater and the chance of occurrence of abnormality is increased in some nodes, there is not exerted any adverse influence thereof onto the monitor data collecting process.

Conversely, even when the monitor data collecting process is delayed, the monitor data acquiring processes can be free of any adverse influence of the delay. Moreover, the monitor data is collected without causing interruption in the processing of the control node. Consequently, in a parallel computer system including a large number of nodes, there is attained an advantageous effect that the monitor data of all nodes can be presented on a display and stored in a log file in the realtime fashion.

In addition, if the monitor data is once gathered in an intermediate control node such that the data is desirably edited to be then collected in the collection node, the onerous concentration of load onto the collection node will be advantageously prevented.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. A monitor data collecting method in a parallel computer system of a distributed memory type including a plurality of monitor information acquiring nodes connected to each other via a high-speed network for acquiring monitor information, each of the acquiring nodes not having a console facility; a monitor information collecting node for collecting the monitor information, and communication means including a method of directly writing the monitor information in a memory of a communication destination in an asynchronous fashion, the method comprising:

directly writing the monitor information acquired by each of the plural acquiring nodes in a data reception area associated therewith of a memory of the collecting node;

referencing by the collecting node the data reception area of the memory of the collecting node in an asynchronous fashion with respect to reception of the monitor information; and writing in a log file the monitor information referenced in the referencing step, thereby logging the monitor information.

2. A monitor data collecting method in a parallel computer system of a distributed memory type including a plurality of monitor information acquiring nodes connected to each other via a high-speed network for acquiring monitor information, each of the acquiring nodes not having a console facility; a monitor information collecting node for collecting the monitor information, and communication means including a method of directly writing the monitor information in a memory of a communication destination in an asynchronous fashion, the method comprising:

a first step of directly writing the monitor information acquired by each of the plural acquiring nodes in a data reception area associated therewith of a memory of the collecting node; and a second step of referencing by the collecting node the data reception area of the memory of the collecting node in an asynchronous fashion with respect to reception of the monitor information wherein the interval of time at which each of the acquiring nodes acquires the monitor information and the interval of time at which the collecting node references the monitor information are adjustable.

3. A monitor data collecting method according to claim 2, wherein the parallel computer system includes a console device (display) connected to the collecting node for displaying thereon the monitor information, and the method further comprises a third step of displaying the monitor information on the console device (display).

4. A monitor data collecting method in a parallel computer system of a distributed memory type including a plurality of monitor information acquiring nodes connected to each other via a high-speed network for acquiring monitor information, each of the acquiring nodes not having a console device, a monitor information collecting node for collecting the monitor information, and communication means directly writing the monitor information in a memory of a collecting node, the method comprising:

a first step of gathering together the monitor information acquired by some of the plural acquiring nodes and writing the monitor information directly in a data reception area associated with a memory of an intermediate node;

a second step of filtering by the intermediate node the monitor information and thereby compressing an amount of the monitor information;

a third step of directly writing the monitor information from each of plural intermediate nodes into a data reception area of the memory of the collecting node in an asynchronous fashion using said communication means; and a fourth step of referencing by the collecting node the data reception area of the memory of the collecting node in asynchronous fashion with respect to reception of the monitor information.

5. A monitor data collecting method according to claim 4, wherein the parallel computer system includes a console device (display) connected to the collecting node for displaying thereon the monitor information, and the method further comprises a fifth step of displaying the monitor information on the console device (display).

6. A monitor data collecting method according to claim 5, further including a sixth step of writing in a log file the monitor information referenced in the fourth step, thereby logging the monitor information.

7. A monitor data collecting method according to claim 5, wherein the interval of time at which each of the acquiring nodes acquires the monitor information and the interval of time at which the collecting node references the monitor information are adjustable.

* * * * *